United States Patent [19]

Kawasaki et al.

[11] 4,419,611

[45] Dec. 6, 1983

[54] WIPER INTERMITTENT MOTION CONTROL DEVICE

[75] Inventors: Teruo Kawasaki; Kouichi Kogawa, both of Yokohama; Hiroyuki Nomura, Fujisawa, all of Japan

[73] Assignee: Nissan Motor Company, Limited, Kanagawa, Japan

[21] Appl. No.: 186,327

[22] Filed: Sep. 11, 1980

[51] Int. Cl.³ .............................................. H02P 1/04
[52] U.S. Cl. .............................. 318/443; 318/DIG. 2
[58] Field of Search .......................... 318/DIG. 2, 443

[56] References Cited

U.S. PATENT DOCUMENTS 3,426,380 2/1969 Caldwell .

FOREIGN PATENT DOCUMENTS 1480634 1/1970 Fed. Rep. of Germany .
2233899 1/1974 Fed. Rep. of Germany .
2854239 6/1980 Fed. Rep. of Germany .

*Primary Examiner*—J. V. Truhe
*Assistant Examiner*—Saul M. Bergmann
*Attorney, Agent, or Firm*—Lowe, King, Price & Becker

[57] ABSTRACT

A device is disclosed for intermittent connection of a wiper drive motor to a power source. The device comprises first means for providing a control signal with its magnitude increased with increasing vehicle running speed, and second means for providing a first signal for a predetermined period of time and a second signal for a period of time variable according to the magnitude of the control signal. Means is provided for connecting the wiper drive motor to the power source in response to the first signal and for disconnecting the wiper drive motor from the power source in response to the second signal.

12 Claims, 4 Drawing Figures

4,419,611

WIPER INTERMITTENT MOTION CONTROL DEVICE

BACKGROUND OF THE INVENTION

1. Field of the Invention

This invention relates to a wiper drive system for use in a road vehicle and, more particularly, to such a wiper drive system including an intermittent motion control device for intermittently connecting a wiper drive motor to a power source.

2. Description of the Prior Art

It is known that for a particular density of rain, the amount of rain dropping on a road vehicle window glass increases with increasing vehicle running speed. Wiper drive systems have been proposed which include a wiper intermittent motion control device manually operable to control the period of intermittent motion of wiper blades. However, such conventional systems require the vehicle operator to operate the wiper intermittent motion control device each time the vehicle stops or starts running, or shifts into a low or high running speed.

Therefore, the present invention provides a wiper intermittent motion control device which can automatically control the period of intermittent motion of wiper blades in accordance with vehicle running speed.

SUMMARY OF THE INVENTION

The present invention provides a wiper intermittent motion control device for use in a road vehicle to intermittently connect a wiper drive motor to a power source. The control device includes first means for providing a control signal having a magnitude which is increased when the vehicle starts running. The first means includes a voltage divider connected across a voltage source and having a series connection of a plurality of resistors, and at least one switch means connected across one of the resistors. The switch means is operable to increase the output of the first means when the vehicle starts running.

The output of the first means is connected to a second means which provides a first signal for a predetermined period of time and a second signal for a period of time variable according to the magnitude of the output of the first means. The second means employs an astable multivibrator in a preferred embodiment. Alternatively, the second means may include a capacitor charged by the output of the first means and discharged through a discharge circuit.

The output of the second means is connected to a third means. The third means is responsive to the first signal applied thereto from the second means for connecting the wiper drive motor to the power source. Also, the third means is responsive to the second signal applied thereto from the second means for disconnecting the wiper drive motor from the power source.

With the wiper intermittent motion control device of the present invention, the period of intermittent motion of the wiper drive motor can thus be reduced with a constant drive time and a reduced rest time when the vehicle starts running.

BRIEF DESCRIPTION OF THE DRAWINGS

The details as well as other features and advantages of this invention are set forth below and are shown in the accompanying drawings, in which.

DESCRIPTION OF THE PREFERRED EMBODIMENTS

Figure 1:
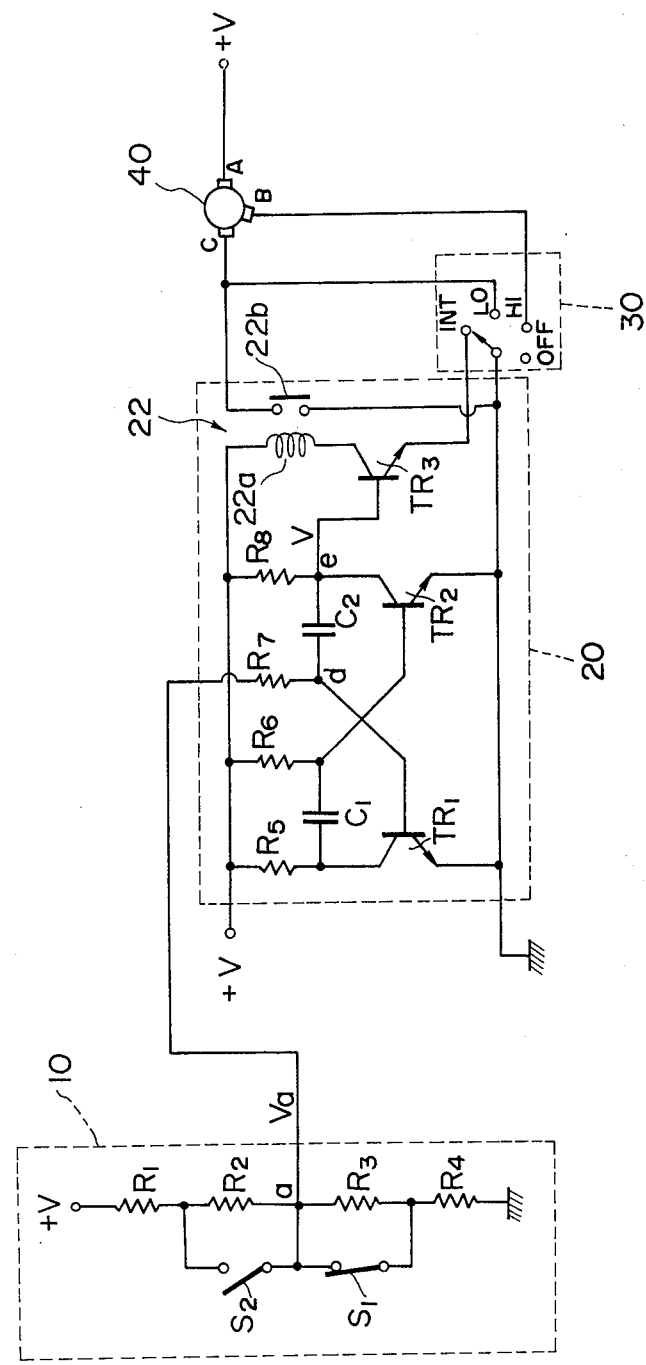
FIG. 1 is a circuit diagram showing one embodiment of a wiper intermittent motion control device made in accordance with the present invention.

Referring first to FIG. 1, there is illustrated one embodiment of a wiper intermittent motion control device constructed in accordance with the present invention. The control device comprises a control signal generator 10 for providing a control signal Va. The control signal generator 10 includes a series connection of resistors R1 to R4. The resistor R1 has its free end connected to a voltage source of a constant voltage $+V$ and the resistor R4 has its free end grounded. A start switch S1 is connected in parallel with the resistor R3. The start switch S1 is closed when the road vehicle is still and becomes open after the road vehicle starts running. The start switch S1 may be associated with a vehicle speed meter such that it can be held open except when the pointer of the speed meter indicates zero speed. In addition, the start switch S1 may be in the form of an electronic switch associated with a digital readout type vehicle speed meter such that it can be held open except when zero indication is made on the digital readout. A top-gear switch S2 is connected across the resistor R2. The top-gear switch S2 may be associated with a power transmission such that it can be held open except when the transmission is shifted in its top-gear position.

When the vehicle is still, the start switch S1 is closed and the top-gear switch S2 is open so that a lowest control voltage $Va_1$ appears at the point a where the resistors R2 nd R3 are joined. When the vehicle starts running, the start switch S1 opens to increase the control voltage Va to a value $Va_2$ which is higher than the value $Va_1$. When the vehicle running speed increases and the transmission is shifted into its top-gear position, the top-gear switch S2 closes to further increase the control voltage Va to a value $Va_3$ which is higher than the value $Va_2$.

The output of the control signal generator 10 is applied to a control circuit 20 which includes a conventional astable multivibrator having first and second transistors TR1 and TR2. The first transistor TR1 has its emitter grounded and its collector connected through a first resistor R5 to the voltage source and also through a first capacitor C1 and a second resistor R6 to the voltage source. The second transistor TR2 has its base connected to the junction of the first capacitor C1 and the second resistor R6. The emitter of the second transistor TR2 is grounded and the collector thereof is connected to the output e of the astable multivibrator. The collector of the second transistor TR2 is further connected through a third resistor R8 to the voltage source and also through a second capacitor C2 and a fourth resistor R7 to the output a of the control signal generator 10. The junction d of the second capacitor C2 and the fourth resistor R7 is connected to the base of the first transistor TR1.

The output e of the astable multivibrator is connected to the base of a switching transistor TR3, the collector of which is connected through the relay coil 22a of a relay 22 to the voltage source. The emitter of the transistor TR3 is coupled to a fixed contact INT of a wiper switch 30. The relay 22 has a relay switch 22b which is held closed to connect a terminal C of a wiper drive motor 40 while current flow occurs through the relay coil 22a. The wiper switch 30 further has three fixed contacts LO, HI and OFF and a movable contact connected to ground. The fixed contact LO is connected to the terminal C of the wiper drive motor 40 for continuous rotation of the wiper drive motor 40 at a low speed. The fixed contact HI is connected to a terminal B of the wiper drive motor 40 for continuous rotation of the wiper drive motor 40 at a high speed. The wiper drive motor 40 has a terminal A connected to the voltage source.

Figure 2:
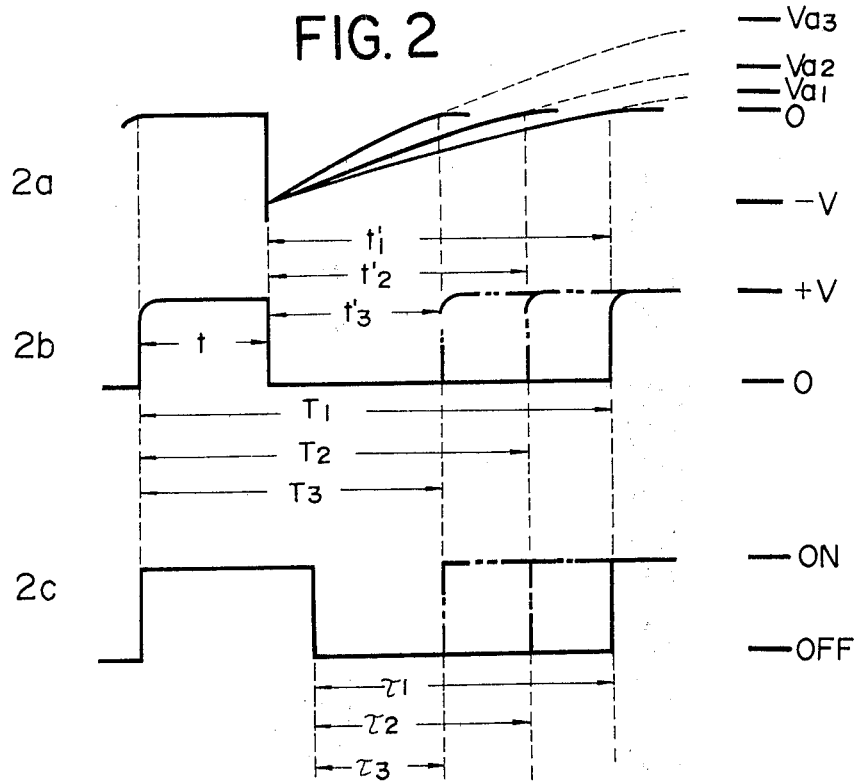
FIG. 2 contains three waveforms 2a, 2b and 2c obtained at various points in the circuit diagram of FIG. 1.

With particular reference now to FIG. 2, there are shown three voltage-versus-time waveforms. FIG. 2a illustrates a waveform of the voltage Vd that appears at the point d where the resistor R7 and the capacitor C2 are joined. FIG. 2b illustrates a waveform of the voltage Ve that appears at the point e; i.e., at the output of the astable multivibrator.

The astable multivibrator generates at its output e a rectangular pulse signal Ve as shown in waveform 2b. The period of time t during which the pulse signal Ve is held at its high level (V volts) is determined at a fixed value by the values of the capacitor C1 and the resistor R6 and the fixed voltage (V volts) of the voltage source, whereas the period of time t' during which the pulse signal Ve is held at its low level (zero volts) is dependent upon the magnitude of the control voltage Va that appears at the output of the control signal generator 10.

When the transistor TR2 becomes conductive, the voltage Ve falls from V volts to zero volts. This causes a voltage drop of V volts at the point d to render the transistor TR1 non-conductive. Since the point d is connected through the resistor R7 to the control voltage Va, the capacitor C2 is charged to gradually increase the voltage Vd. When the voltage Vd reaches zero volt, the transistor TR1 becomes conductive which in turn renders the transistor TR2 non-conductive. Accordingly, the higher the control voltage Va, the higher the speed at which the voltage Vd increases as shown in waveform 2a and thus the shorter the time period t' during which the voltage Ve is held at its low level as shown in waveform 2b and the shorter the period T of the pulse signal Ve. It can be seen in FIG. 2a that the time period t' is at a value t1' and the pulse period T is at a value T1 for the control voltage value Va1, the time period t' is at a value t2' which is shorter than the value t1' and the pulse period T is at a value T2 which is shorter than the value T1 for the control voltage value Va2, and the time period t' is at a value t3' which is shorter than the value t2' and the pulse period T is at a value T3 which is shorter than the value T2 for the control voltage value Va3.

In the INT position of the wiper switch 30 as shown in FIG. 1, when the output signal Ve goes high, the transistor TR3 becomes conductive to allow current flow through the relay coil 22a to close the relay switch 22b so as to cause a voltage Vm (equal to V volts) across the terminals A and C of the wiper drive motor 40 to energize the motor. When the output voltage Ve goes low, the transistor TR3 becomes non-conductive to cut off the current flow through the relay coil 22a so as to open the relay switch 22b. After the wiper blade returns to a predetermined position where it changes over an auto-stop switch (not shown), the wiper drive motor 40 is deenergized to stop rotating.

FIG. 2c illustrates a waveform of the voltage Vm that appears across the terminals A and C of the wiper drive motor 40. It can be seen in FIG. 2c that the rest time $\tau$ during which the wiper drive motor 40 is still becomes shorter as the control voltage Va increases. The rest time $\tau$ is at a value $\tau 1$ for the control voltage value Va1, at a value $\tau 2$ which is shorter than the value $\tau 1$ for the control voltage value Va2, and at a value $\tau 3$ which is shorter than the value $\tau 2$ for the control voltage value Va3.

In this way, the period of intermittent motion of the wiper drive motor 40 can be reudced with a constant drive time and a reduced rest time as the vehicle running speed increases.

Although in this embodiment the start switch is of the type associated with a vehicle speed, it is to be noted that a neutral switch may be used which provides a signal when the transmission is in its neutral position.

Figure 3:
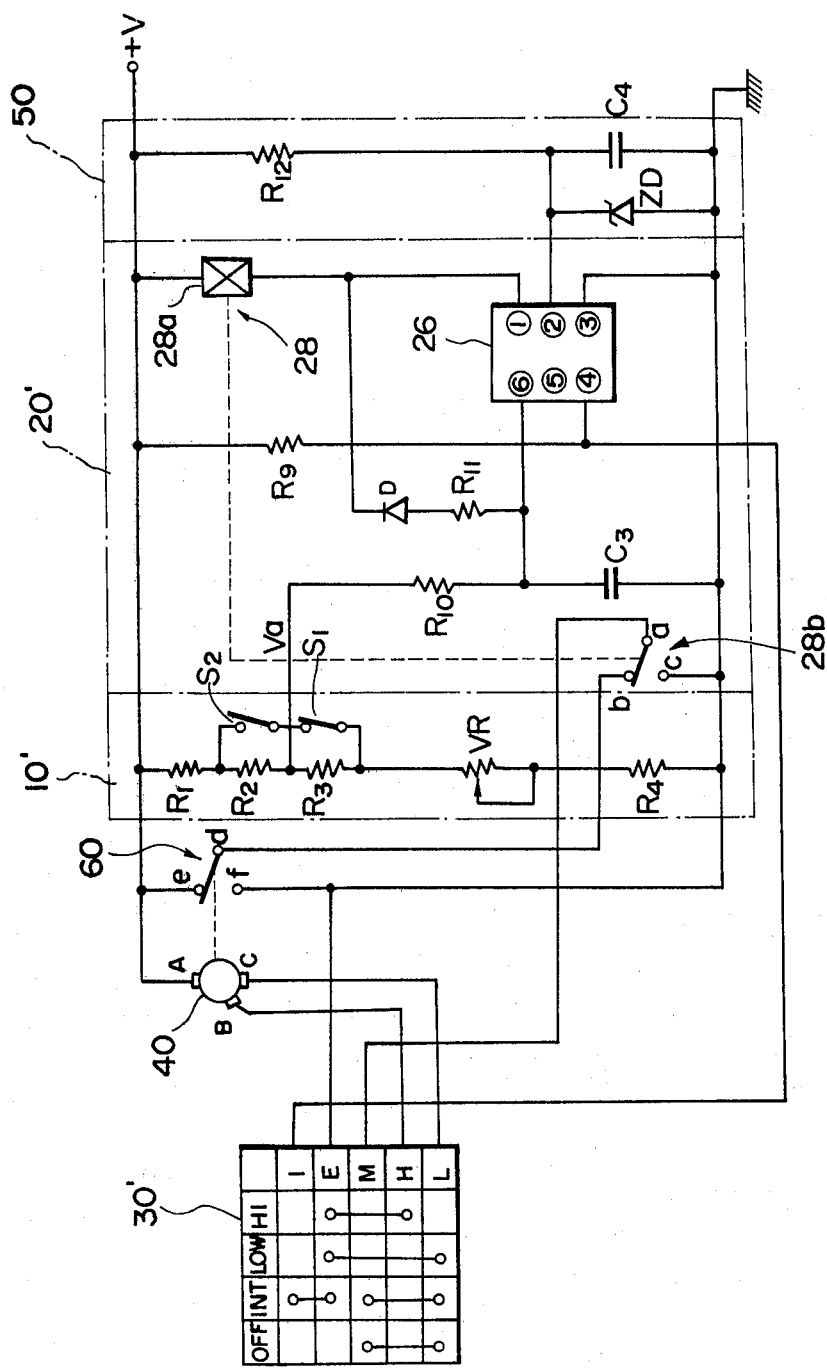
FIG. 3 is a circuit diagram showing a second embodiment of the present invention.

Referring now to FIG. 3, there is illustrated a second embodiment of the present invention, in which like parts are designated by like reference numerals while similar parts having identical functions are designated by the same reference numeral as used in FIG. 1 followed by the suffix prime (').

A wiper switch is diagramatically illustrated at 30' which connects contacts M and L in its OFF position, contacts I and E and also contacts M and L in its INT position, contacts E and L in its LOW position, and contacts E and H in its HI position. The contact E is grounded. The contacts H and L are connected to the high and low speed terminals B and C of the wiper motor 40, respectively.

The control signal generator 10' in this embodiment is substantially similar to that in FIG. 1 except that a variable resistor VR is interposed between the resistors R3 and R4 which allows manual adjustment of the control voltage Va appearing at the output of the control signal generator 10' and thus the period of intermittent motion of the wiper drive motor 40. The presence of the variable resistor VR is optional.

The output of the control signal generator 10' is applied to a control circuit 20' which is different in structure from that in the first embodiment. The control circuit 20' employs an IC (integrated circuit) 26 having an output terminal 1, a power terminal 2, an earth terminal 3, a set-reset terminal 4, a washer terminal 5 (which forms no part of the invention), and an input terminal 6. The terminal 1 of the IC 26 is connected to one end of a relay coil 28a, the other end of which is connected to the voltage source. The relay coil 28a is associated with a relay switch 28b having its movable contact a held in connection with its fixed contact b as shown in FIG. 3 when no current flow occurs through the relay coil 28a and changed over into connection with the fixed contact c when current flow occurs through the relay coil 28a. the terminal 4 of the IC 26 is connected to the contact I of the wiper switch 30' and also through a resistor R9 to the voltage source. The terminal 6 is connected through a capacitor C3 to ground and also through a resistor R10 to the control voltage Va. The terminal 6 is further connected through a series circuit of a resistor R11 and a diode D to the terminal 1.

A voltage regulator circuit 50 is provided for supplying a constant voltage to the terminal 2 of the IC 26. The voltage regulator circuit 50 includes a series circuit of a resistor R12 and a capacitor C4 connected between the voltage source and ground, and a Zener diode ZD coupled in parallel with the capacitor C4. The positive end of the Zener diode ZD is connected to the terminal 2 of the IC 26.

An auto-stop switch is illustrated at 60 which has its movable contact d held in connection with the fixed contact e as shown in FIG. 3 when the wiper drive motor 40 is still and changed over into connection with the fixed contact f when the wiper drive motor 40 starts rotating. The auto-stop switch 60 is associated with the wiper blade so that the movable contact d can be changed over into connection with the fixed contact e when the wiper blade reaches a predetermined position. The movable contact d of the auto-stop switch is connected to the fixed contact b of the relay switch 28b. The fixed contact c of the relay switch 28b is grounded and the movable contact a thereof is connected to the contact M of the wiper switch 30'. The fixed contact e of the auto-stop switch 60 is connected to the voltage source and the fixed contact f thereof is grounded.

In the INT position of the wiper switch 30', the terminal 4 of the IC 26 is grounded through the contacts I and E of the wiper switch 30' to place the IC 26 in operation. Since the capacitor C3 has been charged to maintain the terminal 6 above a predetermined high level VH, the terminal 1 is grounded through the terminal 3. Consequently, current flow occurs through the relay coil 28a to change over the movable contact a of the relay switch 28b into connection with the fixed contact c. This makes a connection of the low speed terminal C of the wiper drive motor 40 to ground through the contacts M and L of the wiper switch 30' so as to start rotation of the wiper drive motor 40.

In this state of the circuit, the capacitor C3 discharges rapidly through a discharge circuit including the resistor R11, the diode D and the terminal 1 of the IC26. When the voltage at the terminal 6 falls below a predetermined low level VL, the voltage at the terminal 1 changes to its high level (V volts) to cut off the current flow through the relay coil 28a so as to change over the movable contact a of the relay switch 28b into connection with the fixed contact b. Since the movable contact d of the auto-stop switch 7 is held in connection with the fixed contact f after activation of the wiper drive motor 40, the terminal C of the wiper drive motor 40 is held grounded through the wiper switch 30, the relay switch 28b and the auto-stop switch 60 so that the wiper drive motor 40 continues to rotate. When the wiper blade returns to its predetermined position, the auto-stop switch 60 returns to its initial position as shown in FIG. 3 to provide a short between the terminals A and C of the wiper drive motor 40 so as to stop rotation of the wiper drive motor 40.

After the voltage at the terminal 1 of the IC 26 goes high, the control voltage Va gradually charges the capacitor C3 through the resistor R10. When the voltage across the capacitor C3 reaches the predetermined high level VH, the voltage at the terminal 1 of the IC 26 falls again to the ground level so as to start the wiper drive motor 40 in the same manner as described above.

Figure 4:
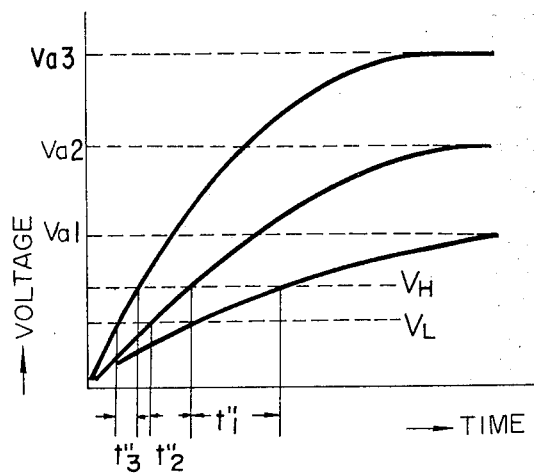
FIG. 4 is a graph of three capacitor charging characteristic curves used in explaining the operation of the wiper intermittent motion control device of FIG. 3.

FIG. 4 illustrates three capacitor charging characteristic curves. It can be seen in FIG. 4 that the higher the control voltage Va, the shorter the time $t''$ it takes the voltage across the capacitor C3 to change from the predetermined low level VL to the predetermined high level VH; that is, the rest time during which the wiper drive motor 40 is still. The time $t'$ is at a value $t1''$ for the control voltage value Va1, at a value $t2''$ which is shorter than the value $t1''$ for the control voltage value Va2, and at a value $t3''$ which is shorter than the value $t2''$ for the control voltage value Va3.

In this way, the period of intermittent motion of the wiper drive motor 40 can be reduced with a constant drive time and a reduced rest time when the vehicle starts running.

While the present invention has been described in conjunction with specific embodiments thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. A device for use in a road vehicle having a transmission to intermittently connect a wiper drive motor means to a power source for intermittent motion of a wiper blade, comprising:
   (a) first means for providing a control signal output with its magnitude increased to a first predetermined value when said vehicle starts running and to a second predetermined value higher than the first predetermined value when said transmission is in a top-gear position;
   (b) second means for providing a first signal for a predetermined period of time and a second signal for a period of time variable according to the magnitude of said control signal applied thereto; and
   (c) third means for connecting said wiper drive motor means to said power source in response to said first signal applied thereto from said second means and for disconnecting said wiper drive motor means from said power source in response to said second signal applied thereto from said second means.

2. The device of claim 1, wherein said second means comprises a first transistor having its emitter grounded and its collector connected through a first resistor to a voltage source and also through a first capacitor and a second resistor to said voltage source, a second transistor having its base connected to the junction of said first capacitor and said second resistor, its emitter grounded, and its collector connected directly to said third means, through a third resistor to said voltage source, and through a second capacitor and a fourth resistor to the output of said first means, the junction of said second capacitor and said fourth resistor being connected to the base of said first transistor.

3. The device of claim 1, wherein said second means comprises a capacitor having two terminals, one of said terminals being grounded and the other terminal being connected through a first resistor to the output of said first means, and means for permitting said capacitor to discharge through a second resistor and for providing said first signal to said third means when the voltage at said other terminal of said capacitor is above a first level and for providing said second signal to said third means when the voltage at said other terminal of said capacitor is below a second level lower than said first level.

4. The device of claim 1, wherein said first means comprises a voltage divider having a series connection of a plurality of resistors connected across a voltage source, a switch associated with a vehicle speed meter indicating the running speed of said vehicle being connected across one of said resistors, said switch being actuated to increase the magnitude of said control signal to a predetermined value when said vehicle starts running.

5. The device of claim 4, wherein said switch being actuated when said vehicle speed meter indicates non-zero speed.

6. The device of claim 1, wherein said first means comprises a voltage divider having a series connection of a plurality of resistors connected across a voltage source; a first switch connected across one of said resistors, said first switch being actuated to increase the magnitude of said control signal to the first predetermined value when said vehicle starts running; a second switch connected across another resistor, said second switch being actuated to increase the magnitude of said control signal to the second predetermined value when said transmission is in its top-gear position.

7. The device of claim 6, wherein said first switch is associated with a vehicle speed meter for indicating the running speed of said vehicle, said first switch being actuated when said vehicle speed meter indicates zero speed.

8. The device of claim 6, wherein said voltage divider further includes a variable resistor connected in series with said resistor series connection.

9. The device of claim 1, which further comprises an auto-stop switch for holding said wiper drive motor means connected to said power source until said wiper blade returns to a predetermined position after said second signal occurs.

10. A device for use in a road vehicle having a transmission to intermittently connect a wiper drive motor means to a power source for intermittent motion of a wiper blade, comprising:
 (a) first means for providing a control signal output having a magnitude changing to a first predetermined value when said vehicle starts running and to a second predetermined value different from the first predetermined value when said transmission is in a top-gear position;
 (b) second means for providing a first signal for a predetermined period of time and a second signal for a period of time variable according to the magnitude of said control signal applied thereto; and
 (c) third means for connecting said wiper drive motor means to said power source in response to said first signal applied thereto from said second means and for disconnecting said wiper drive motor means from said power source in response to said second signal applied thereto from said second means.

11. The device of claim 10 wherein said second means comprises an astable multivibrating means responsive to the magnitude of said control signal output by said first means for generating said first and second signals.

12. The device of claim 11 wherein said astable multivibrating means includes first timing means for determining the period of said first signal and second timing means, responsive to the magnitude of said control signal output by said first means, for determining the variable period of time for providing said second signal.

* * * * *